United States Patent [19]
Watamura

[11] Patent Number: 5,956,853
[45] Date of Patent: Sep. 28, 1999

[54] PIPE CUTTING TOOL FOR PLASTIC PIPE

[76] Inventor: Abe Watamura, 2610—9$^{th}$St., Berkeley, Calif. 94710

[21] Appl. No.: 08/871,928

[22] Filed: Jun. 10, 1997

[51] Int. Cl.$^6$ ..................................................... B23D 21/06
[52] U.S. Cl. ..................................................... 30/95; 30/94
[58] Field of Search ................................. 30/95, 94, 101, 30/96, 90.1; 83/745

[56] References Cited

U.S. PATENT DOCUMENTS

| | | | |
|---|---|---|---|
| 823,796 | 6/1906 | Leyes | 30/95 |
| 4,092,774 | 6/1978 | Watts . | |
| 4,368,577 | 1/1983 | Babb . | |
| 4,446,620 | 5/1984 | Velte . | |
| 4,646,438 | 3/1987 | Hessler . | |
| 4,785,538 | 11/1988 | Meyer . | |
| 4,837,934 | 6/1989 | Beermann . | |
| 4,845,849 | 7/1989 | Aubriot . | |
| 5,018,275 | 5/1991 | Huang . | |
| 5,067,240 | 11/1991 | You . | |
| 5,129,158 | 7/1992 | Campagna . | |
| 5,179,781 | 1/1993 | Weaver . | |
| 5,203,083 | 4/1993 | Domonoske . | |
| 5,218,765 | 6/1993 | Huang . | |
| 5,301,427 | 4/1994 | Swatedk . | |
| 5,373,639 | 12/1994 | Huang . | |

*Primary Examiner*—Douglas D. Watts
*Attorney, Agent, or Firm*—Carol W. Burton; Holland & Hart LLP

[57] ABSTRACT

A tool for cutting an elongated pipe is disclosed which includes an annular collar selectively positionable on the pipe for slidable movement along the length of the pipe to a predetermined position and separate selectable rotational movement about said predetermined position. A cutting member is pivotably mounted to the annular collar, so that as the annular collar and cutting member are rotated about the predetermined position, a circular score is formed on the pipe. Further rotation of the cutting tool results in cutting of the pipe through the score. In a preferred embodiment of the present invention, the annular collar includes a radial expansion slot for expansion of the collar and frictional engagement of the pipe to be cut, the cutting member includes a blade mounted between opposing first and second blade holding members and a biasing spring attached to the first blade holding member with a fastener.

16 Claims, 4 Drawing Sheets

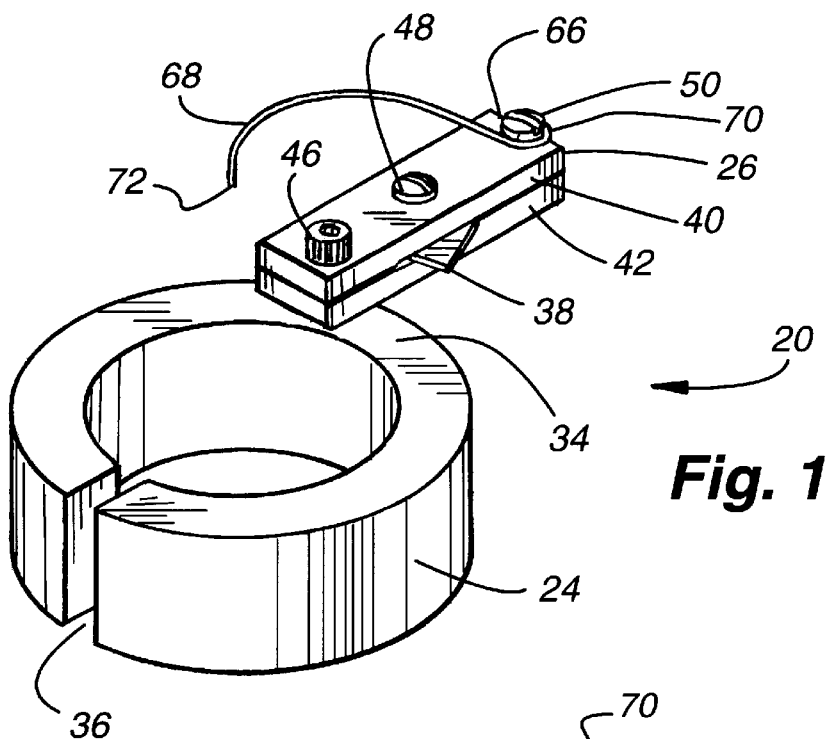
Fig. 1
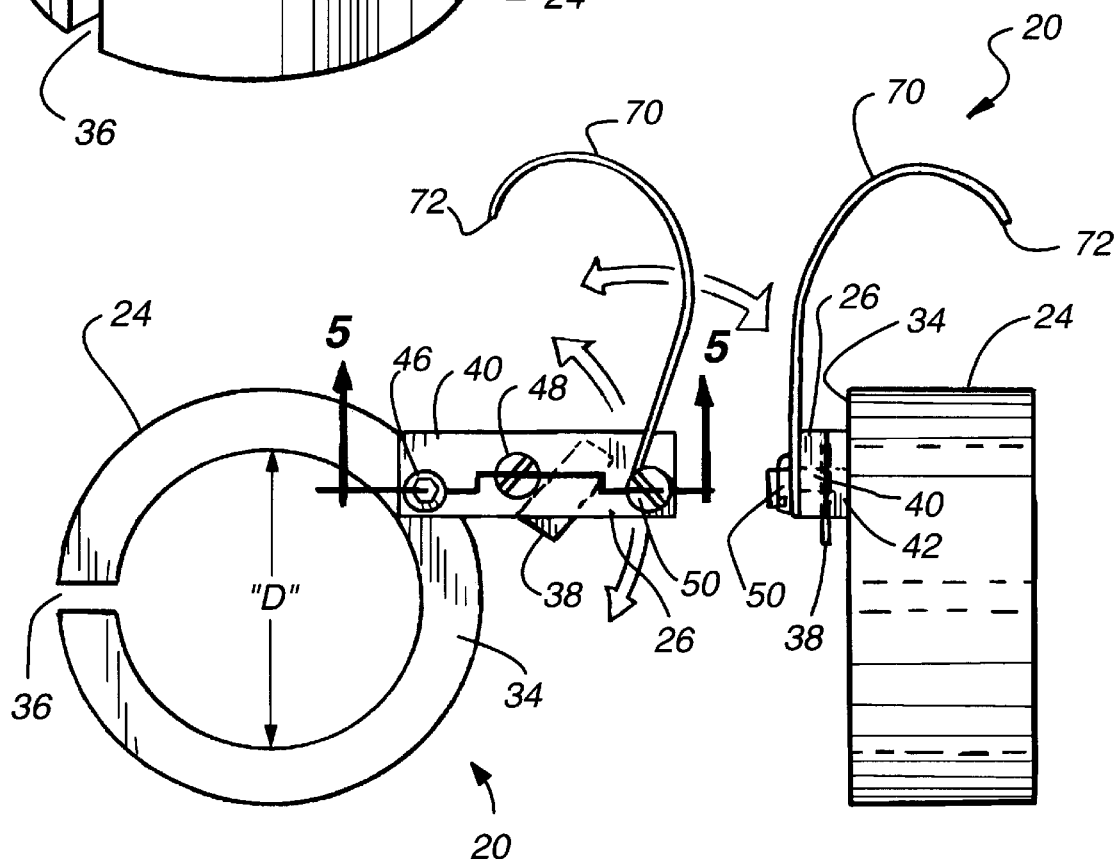
Fig. 2
Fig. 3

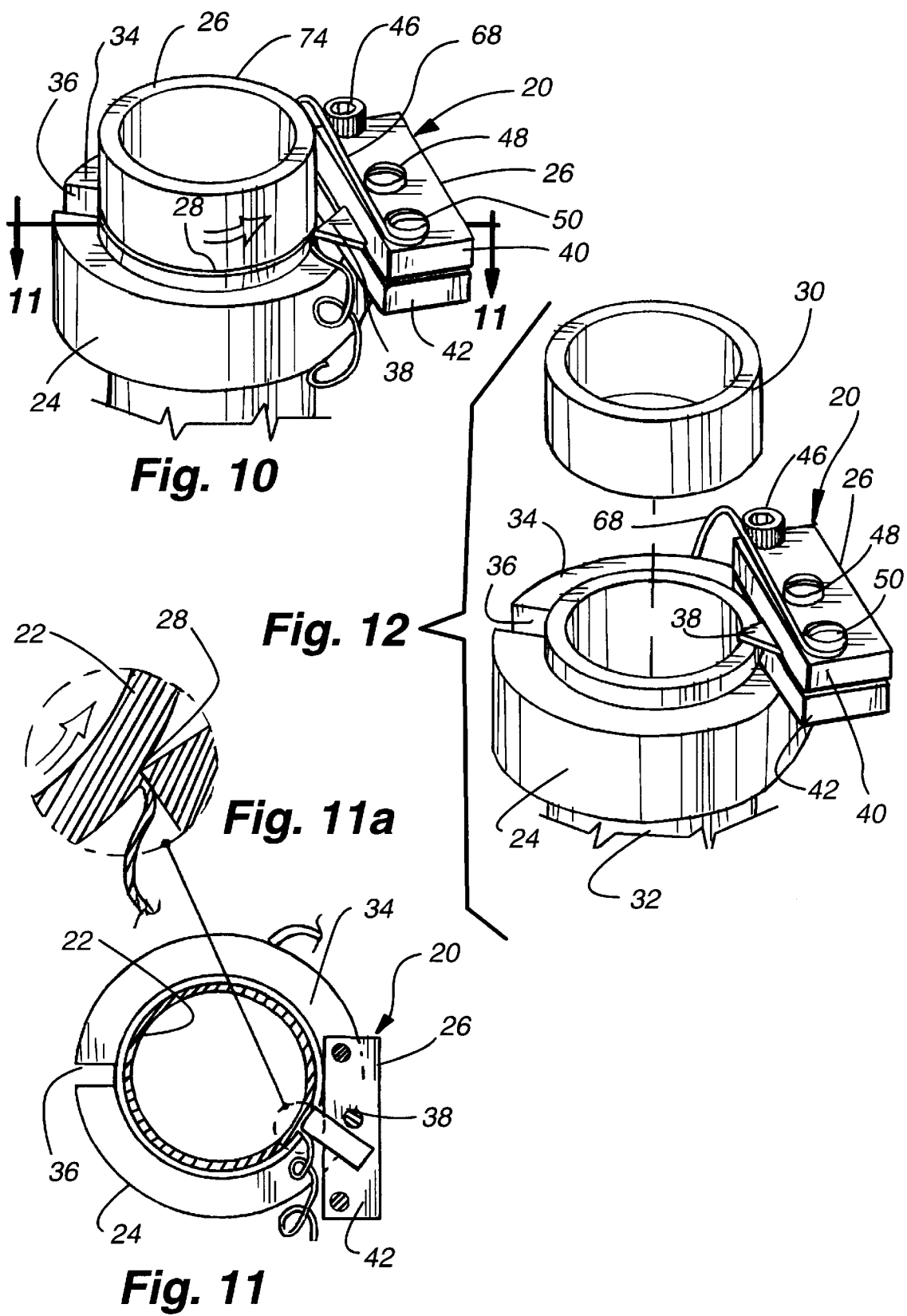

PIPE CUTTING TOOL FOR PLASTIC PIPE

FIELD OF THE INVENTION

This invention relates to pipe cutting tools, and more particularly, to pipe cutting tools for plastic pipes.

BACKGROUND OF THE INVENTION

Homeowners have traditionally relied upon plumbers to repair and replace faulty plumbing. Professional plumbers are needed, in part, because older plumbing utilizes metal pipe, which require special equipment and experience to cut, repair and weld. The obvious difficulty in cutting metal pipe arises from the hardness of the steel or other metal used.

Although plastic pipe is now commonly used in new homes, plastic pipe can be difficult to cut to size because of its flexibility. For example, when attempting to cut plastic pipe with a hand saw to a desired length, application of sawing force to the pipe causes the pipe to bow, which results in an uneven cut. A pipe with an unevenly cut end may not be usable for attachment at the joint to which it is to be bonded.

While special tools have been developed to cut plastic pipe for use by plumbers and other skilled persons, such equipment is complicated to use, bulky or expensive, and thus not suitable for use by a homeowner or other unskilled person who may only need to cut a single length of plastic pipe. Thus, there remains a need for a plastic pipe cutting tool which is both inexpensive to manufacture and easy to use by an unskilled person.

It is against this background that the significant improvements and advancements of the present invention have taken place.

OBJECTS OF THE INVENTION

It is the principal object of the present invention to develop a pipe cutting tool which may be easily operated by an unskilled person.

It is a further object of the present invention to develop a pipe cutting tool which will produce a clean and even cut fully transverse and perpendicular to the longitudinal axis of the pipe.

It is a yet further object of the present invention to develop a pipe cutting tool which can be economically made for use by homeowners or others unskilled persons, and which does not require the use of a vise, welding equipment or other tools or special knowledge to operate.

SUMMARY OF THE INVENTION

In accordance with the major aspects of the present invention, a tool for cutting an elongated pipe is disclosed which includes an annular collar selectively positionable on the pipe for slidable movement along the length of the pipe to a predetermined position and separate selectable rotational movement about the predetermined position. A cutting member is biasingly mounted to the annular collar, so that as the annular collar and cutting member are rotated about the predetermined position, a circular score is formed on the pipe. Further rotation of the cutting tool cuts the pipe through the score.

In a preferred embodiment of the present invention, the annular collar includes a radial expansion slot for expansion of the collar and frictional engagement of the pipe to be cut. The cutting member includes a blade mounted between opposing first and second blade holding members and a biasing spring attached to the first blade holding member with a fastener. The cutting member is pivotably fastened to the annular collar.

The aforementioned tool can be manufactured easily and economically, and thus may be made available to homeowners at an affordable price. When a homeowner or unskilled person utilizes the cutting tool of the present invention to cut a plastic pipe, a pipe end is produced which is even and fully transverse to the length of the pipe. The cleanly cut pipe end so produced is achieved without requiring the use of a vise, welding equipment or other tools or special knowledge.

A more complete appreciation of the present invention and its scope can be obtained from understanding the following detailed description of presently preferred embodiments of the invention, and the appended claims.

BRIEF DESCRIPTION OF THE DRAWINGS

FIG. 1 is an isometric view of a preferred embodiment of the pipe cutting tool of the present invention.

FIG. 2 is a top view of the pipe cutting tool shown in FIG. 1.

FIG. 3 is a side view of the pipe cutting tool shown in FIGS. 1 and 2.

FIG. 10 is an isometric view of the pipe cutting tool shown in FIGS. 7–9, mounted on the pipe to be cut, with the pipe partially cut.

FIG. 11 is a section view of the pipe cutting tool and partially cut pipe shown in FIG. 10, taken through the line 11—11 of FIG. 10.

FIG. 11A is a detail view of a portion of FIG. 11.

FIG. 12 is an isometric view of the pipe cutting tool and pipe shown in FIGS. 7–11, with the pipe fully cut.

DETAILED DESCRIPTION OF THE INVENTION

Figures 4, 5:
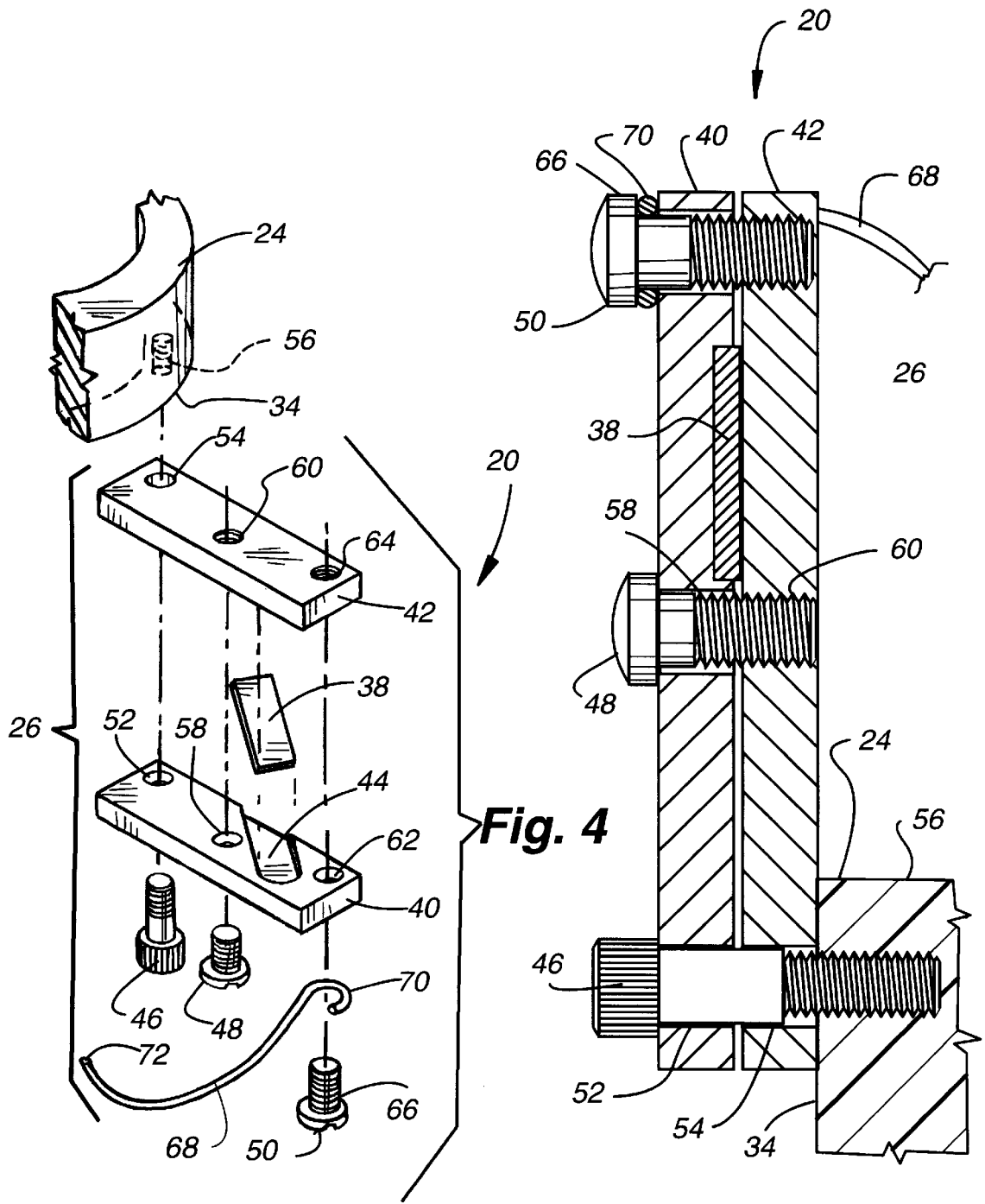
FIG. 4 is an exploded view of the cutting member component of the pipe cutting tool shown in FIG. 1.
FIG. 5 is a section view of the pipe cutting tool shown in FIG. 1, taken through the line 5—5 of FIG. 1.

In accordance with the present application, and as shown in FIGS. 1–12, a tool 20 for cutting an elongated pipe 22 (FIGS. 6–11 and FIG. 11A) is disclosed which includes an annular collar 24 selectively positionable on pipe 22 for slidable movement along the length of pipe 22 to a predetermined position and separate selectable rotational movement about the predetermined position. A cutting member 26 is pivotably mounted to annular collar 24, so that as collar 24 and cutting member 26 are rotated about the predetermined position, a circular score 28 (FIG. 10) is formed on pipe 22. Further rotation of cutting tool 20 results in the cutting of pipe 22 through score 28 into pipe sections 30 and 32 (FIG. 12).

In a preferred embodiment of the present invention, annular collar 24 includes a side wall 34 to which cutting member 26 is pivotably mounted. Collar 24 has an inside diameter "D" (FIG. 2) and includes a radial expansion slot 36 formed therein.

Cutting member 26 of the preferred embodiment includes a blade 38 receivably mounted between opposing first and second blade holding members 40 and 42, in a channel 44 formed in blade holding member 40 (FIG. 4). Referring now to FIG. 5, it can be seen that blade 38 is held in place, and first and second blade holding members 40 and 42 are held together, by first, second and third fasteners 46, 48 and 50 which extend through members 40 and 42.

First fastener 46 extends through a first aperture 52 formed in first blade holding member 40, through a second aperture 54 formed in second blade holding member 42, and a third threaded aperture 56 formed in side wall 34 of collar 24. First fastener 46, which preferably is a hex socket screw, is fixedly mounted in third aperture 56, but has sufficient clearance in first and second apertures 52 and 54, to allow first and second blade holding members 40 and 42 to pivot around fastener 46.

Second fastener 48 extends through a fourth threaded aperture 58 formed in first blade holding member 40 and through a fifth threaded aperture 60 formed in second blade holding member 42. Preferably, second fastener 48 is a screw which is optionally removable if replacement of blade 38 is desired.

Third fastener 50 extends through a sixth threaded aperture 62 formed in first blade holding member 40 and through a seventh threaded aperture 64 formed in second blade holding member 42. Third fastener 50 has a fastener head 66. Fixedly mounted between fastener head 66 and first blade holding member 40 is an elongated spring 68 having a spring loop 70 and an opposing spring end 72.

Figure 6:
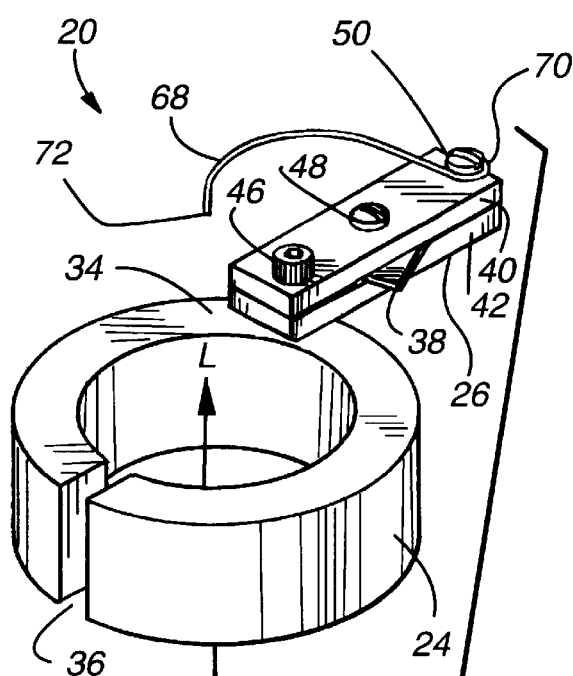
FIG. 6 is an isometric view of the pipe cutting tool shown in FIGS. 1–5, prior to insertion on a pipe to be cut with the tool.
Figure 7:
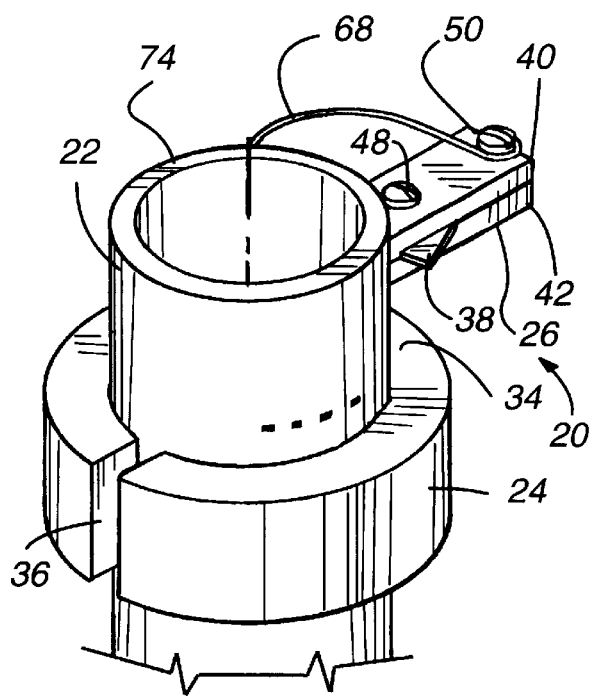
FIG. 7 is an isometric view of the pipe cutting tool shown in FIG. 6 mounted on the pipe to be cut with the tool.

A plastic pipe is cut with the pipe cutting tool 20 of the present invention as shown in FIGS. 6–12. Referring first to FIG. 6, it is seen that that pipe 22 has a longitudinal axis L—L and an outside pipe diameter "d". Preferably, outside pipe diameter "d" is slightly larger than inside collar diameter "D". For example, when pipe 22 has an outside pipe diameter "d" of 1.5 inches, a preferred inside collar diameter "D" is approximately 1.495 inches, i.e., 0.005 inches less than diameter "d". Because of the slight difference in diameter length, insertion of pipe end 74 into collar 24 requires expansion slot 36 to widen slightly, causing to collar 24 to frictionally engage pipe 22. Pipe 22 is further inserted through annular collar 24 until pipe end 74 extends beyond collar 24 (FIG. 7) to a predetermined position along axis L—L, such that blade 38 is adjacent the position on pipe 22 to be cut.

Figure 9:
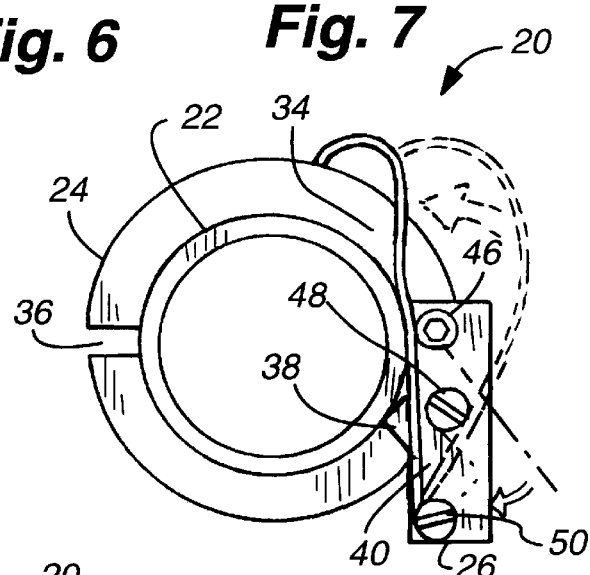
FIG. 9 is a top view of the pipe cutting tool shown in FIG. 7, mounted on the pipe to be cut with the biasing member of the pipe cutting tool in pipe-cutting position.
Figure 8:
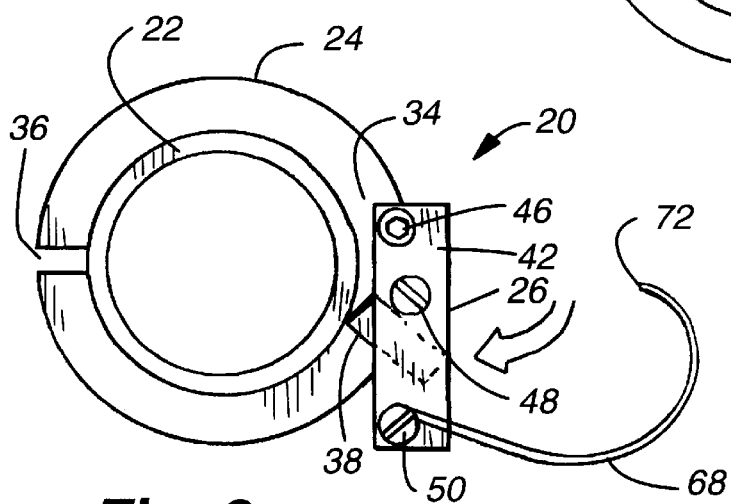
FIG. 8 is a top view of the pipe cutting tool shown in FIG. 7, mounted on the pipe to be cut with a biasing member of the pipe cutting tool in a retracted position.

Referring now to FIGS. 8–9, it can be seen that cutting member 26 is rotated towards pipe 22 until blade 38 contacts pipe 22, and spring 68 positioned between the head 53 of first fastener 52 and pipe 22, with spring end 74 contacting collar 24. By positioning spring 68 in this manner, a biasing force is brought to bear on cutting member 26 and on blade 38 at the point of contact with pipe 22.

Referring now to FIGS. 10–11, it can be seen that as pipe cutting tool 20 is rotated about pipe 22, the biasing force of spring 68 initially causes blade 38 to form a score 28 in pipe 22. Additional rotation of pipe cutting tool 20 about pipe 22 causes the blade 38 to cut further into score 28, until pipe 22 is cut into sections 30 and 32 (FIG. 12).

It can be readily seen that the pipe cutting tool of the present invention can be easily used by an unskilled person to cut to plastic pipe. The pipe cutting tool can be used in a confined space. When a homeowner or unskilled person utilizes the cutting tool of the present invention to cut a plastic pipe, a pipe end is produced which is even and perpendicular to the length of the pipe. The cleanly cut pipe end so produced is achieved without requiring the use of a vise, welding equipment or other tools or special knowledge. It can be manufactured easily and economically, and thus may be made available to homeowners at an affordable price.

Presently preferred embodiments of the present invention and many of its improvements have been described with a degree of particularity. It should be understood that this description has been made by way of preferred examples, and that the invention is defined by the scope of the following claims.

What is claimed is:

1. A tool for cutting a pipe, said pipe having a longitudinal axis, said tool comprising:

a c-shaped ring having a c-shaped leading edge, an opposing c-shaped trailing edge, and an expansion slot extending from said leading edge to said trailing edge, said c-shaped ring being selectively positionable on the pipe for separate selectable rotational movement about said longitudinal axis and slidable movement along said longitudinal axis;

a cutting member pivotably mounted to said c-shaped ring; and a biasing member attached to said cutting member for maintaining frictional engagement of said cutting member with said pipe, wherein as said c-shaped ring and said cutting member are rotated together about said longitudinal axis, a circular score is formed on said pipe through which said pipe is cut.

2. A tool for cutting a pipe according to claim 1 further comprising:

a biasing member attached to said cutting member for maintaining frictional engagement of said tool with said pipe at a selected position along said longitudinal axis of said pipe.

3. A tool for cutting a pipe according to claim 1 further comprising:

biasing means attached to said cutting member for maintaining frictional engagement of said tool with said pipe at a selected position along said longitudinal axis.

4. A tool for cutting a pipe according to claim 1 wherein said cutting member includes a blade.

5. A tool for cutting a pipe according to claim 1 further comprising:

a biasing member attached to said cutting member for maintaining frictional engagement of said tool with said pipe at a selected position along said longitudinal axis of said pipe; and a blade mounted to said cutting member.

6. A tool for cutting a pipe according to claim 1 further comprising:

biasing means attached to said cutting member for maintaining frictional engagement of said tool with said pipe at a selected position along said longitudinal axis of said pipe; and a blade releasably mounted to said cutting member.

7. A tool for cutting a pipe according to claim 1 wherein said cutting member includes:

a blade;

a blade holding member pivotably mounted to said c-shaped member; and a biasing member attached to said cutting member for maintaining frictional engagement of said tool with said pipe at a selected position along said longitudinal axis of said pipe.

8. A tool for cutting a pipe according to claim 1 wherein said cutting member includes:

a blade;

a blade holding member pivotably mounted to said c-shaped member; and biasing means attached to said cutting member for maintaining frictional engagement of said tool with said pipe at a selected position along said longitudinal axis of said pipe.

9. A tool for cutting a pipe according to claim 2 wherein biasing member is a spring.

10. A tool for cutting a pipe according to claim 3 wherein biasing means is a spring.

11. A tool for cutting a pipe, said pipe having a longitudinal axis and an outside pipe diameter, said tool comprising:

c-shaped ring having opposing collar first and second ring ends, and an expansion slot formed therein extending from said first ring end to said second ring end, said c-shaped ring being selectively positionable on the pipe for separate selectable rotational movement about said longitudinal axis and slidable movement along said longitudinal axis a cutting member comprising a blade and a blade holding member, said cutting member pivotably mounted to said c-shaped ring and a biasing member mounted to said cutting member for frictional engagement with said c-shaped ring; wherein as said c-shaped ring and said cutting member are rotated together about said longitudinal axis, a circular score encircling said pipe is formed through which said pipe is cut.

12. A tool for cutting a pipe according to claim 11 wherein the biasing member includes a spring.

13. A tool for cutting a pipe according to claim 12 wherein said blade holding member includes an upper plate and a lower plate.

14. A method of cutting a pipe with a cutting device comprising a c-shaped ring having a longitudinal length and an expansion slot with an unstressed slot width formed therein extending the length of said ring and defining thereby opposing longitudinal slot edges, and a cutting member pivotably mounted to said c-shaped ring, said method comprising the steps of:

widening said expansion slot beyond said unstressed slot width by spreading apart said opposing longitudinal slot edges to form a widened expansion slot;

positioning said c-shaped ring with widened expansion slot on said pipe;

rotating said c-shaped ring and pivotably mounted cutting member together about said pipe to create a circular score thereon; and further rotating said c-shaped ring and cutting member together about said plastic pipe thought said score until said pipe is transversely cut.

15. A method of cutting a pipe with a cutting device comprising a c-shaped ring having a longitudinal length and an expansion slot with an unstressed slot width formed therein extending the length of said ring and defining thereby opposing longitudinal slot edges, and a cutting member pivotably mounted to said c-shaped ring, said method comprising the steps of:

widening said expansion slot beyond said unstressed slot width by spreading apart said opposing longitudinal slot edges to form a widened expansion slot;

positioning said c-shaped ring with widened expansion slot on said pipe;

rotating said c-shaped ring and pivotably mounted cutting member together about said pipe to create a circular score thereon; and further rotating said c-shaped ring and cutting member together about said plastic pipe thought said score until said pipe is transversely cut.

16. The tool for cutting a pipe according to claim 1 wherein the c-shaped ring is selectively positionable on the pipe for frictional engagement of said c-shaped ring with said pipe and wherein said frictional engagement of said c-shaped ring with said pipe maintains said c-shaped ring at said position along said longitudinal axis irrespective of pipe orientation.

\* \* \* \* \*